United States Patent [19]
Saunders

[11] 3,921,595
[45] Nov. 25, 1975

[54] ROTARY INTERNAL COMBUSTION ENGINE

[75] Inventor: Leslie Sargeant Saunders, Sandringham, Australia

[73] Assignees: Gunther Paul Zepernick, Doncaster; Roy Herbert Watts, East Bentburg; Max Albert, East Oakburg, all of Australia

[22] Filed: Oct. 10, 1973

[21] Appl. No.: 404,899

[30] Foreign Application Priority Data
Oct. 11, 1972 Australia.................. 785/72

[52] U.S. Cl. ............................................ 123/8.23
[51] Int. Cl.² ........................................ F02B 53/08
[58] Field of Search ................. 123/8.23, 8.41

[56] References Cited
UNITED STATES PATENTS
1,440,451 1/1923 Ford ............................. 123/8.41
2,583,633 1/1952 Cronin .......................... 123/8.41

Primary Examiner—C. J. Husar
Assistant Examiner—Michael Koczo, Jr.
Attorney, Agent, or Firm—Sherman & Shalloway

[57] ABSTRACT

A two stage rotary internal combustion engine consists of a compression chamber and an expansion chamber having respectively an inlet and an exhaust port. A rotor is arranged in each chamber to rotate therein in timed relation to one another. At least one vane is associated with each chamber, and each chamber, rotor and vane therein being so shaped and arranged to define a sealed working chamber which varies in volume as the rotor rotates. A transfer port communicates the compression and expansion chambers and means are provided to selectively open and close the transfer port in timed relation with the rotation of the rotors.

2 Claims, 3 Drawing Figures

ROTARY INTERNAL COMBUSTION ENGINE

The present invention relates to rotary internal combustion engines of the type comprising a rotor mounted for rotation on a shaft within a housing, means for introducing a charge of combustible fuel to the housing and ignition means for igniting the charge.

It is an object of the present invention to provide a rotary engine of the above type which is simple in construction, has few moving parts, and is economical to manufacture.

It is a further object to provide an engine of light weight and small size relative to the power output.

It is another object to provide an engine wherein the power thrust is directly transmitted to the main shaft with no intermediate mechanical connections which absorb power such as for example connecting rods or crankshafts.

With the above objects in view the present invention provides a two stage rotary internal combustion engine comprising a compression chamber and an expansion chamber having respectively an inlet and an exhaust port, a rotor in each chamber arranged to rotate therein in timed relation to one another, at least one vane associated with each chamber, each chamber and the rotor and vane therein being so shaped and arranged to define a sealed working chamber which varies in volume as the rotor rotates, a transfer port communicating the compression chamber and expansion chamber, and means to selectively open and close the ports in timed relation with the rotation of the rotors, the arrangement being such that a combustible mixture compressed in the compression chamber is expanded in the expansion chamber after ignition to induce rotation of the rotors.

According to a preferred embodiment of the invention, the engine comprises first and second relatively fixed coaxial rotor portions, each portion having at least one radially outwardly extending lobe in peripheral sealing contact with the housing, first and second annular chambers formed by the housing and the first and second rotor portions respectively, a fuel inlet port within the housing communicating with the first chamber, a transversely extending first sealing vane resiliently mounted within the housing in peripheral sealing contact with the first rotor portion located adjacent to, and preceding, the inlet port, ignition means associated with the first chamber for the ignition of the compressed fuel therein, located within the housing adjacent to, and preceding, the first sealing vane, a transfer port within the housing communicating between the first and second chambers for the transfer of combustion products from the first chamber to the second chamber located adjacent to, and preceding, the first sealing vane, a transversely extending the second sealing vane resiliently mounted within the housing in peripheral sealing contact with the second rotor portion located adjacent to, and preceding, the transfer port, an exhaust port within the housing communicating with the second chamber for the discharge of the combustion products from the second chamber located adjacent to, and preceding, the second sealing vane, the lobes of the first and second rotor portions being so shaped as to act as cams relative to their associated sealing vanes and being so disposed relative to each other that when the first rotor portion has reached the end of the compression cycle and the fuel charge has been ignited in the first chamber, the transfer port is opened by both first and second rotor portions and the second rotor portion is commencing its intake cycle to receive the expanding combustion products from the transfer port.

It will be understood that the term "preceding" and other like relative directional terms used throughout the specification are to be construed on the basis of the direction of rotation of the rotor.

Advantageously, the rotor may include a plurality (e.g. three) of lobes on each portion thereof resulting in a corresponding number of inlet, transfer and outlet ports, first and second sealing means and ignition means providing an enhanced power output of the engine.

The transversely extending sealing vanes are conveniently spring mounted in complemental slots within the housing which when not in contact with the lobes of the rotor extend transversely across the full width of their associated chamber providing a firm gas seal against the rotor walls both during the fuel intake and compression cycles. In the case of very large engines, e.g. diesel engines, vanes of a different type, e.g. rollers, may be utilised to withstand greater forces and to reduce frictional forces where large diameter rotors are used. Furthermore, it will be appreciated that the vanes may alternatively be located within the rotor in which case the lobes will be associated with the housing.

The lobes of the two rotor portions may be integral radial extensions of the rotor which is radially spaced from its housing, or, the lobes may be attached to the rotor portions by appropriate means for convenient removal or repalcement thereof.

The lobes may advantageously be shaped with leading and trailing faces in the shape of an so as to act as cams relative to the transversely extending sealing members.

Advantageously, the two rotor portions are rigidly connected, e.g. keyed, in fixed relationship to each other so that the lobes are in the required relative disposition to provide sequential operations of induction, compression, combustion, expansion and exhaust in the respective chambers.

The invention will now be described with reference to a preferred embodiment thereof wherein the rotary internal combustion engine has three lobes per rotor. The engine is illustrated in the accompanying drawings, in which.

Figure 1:
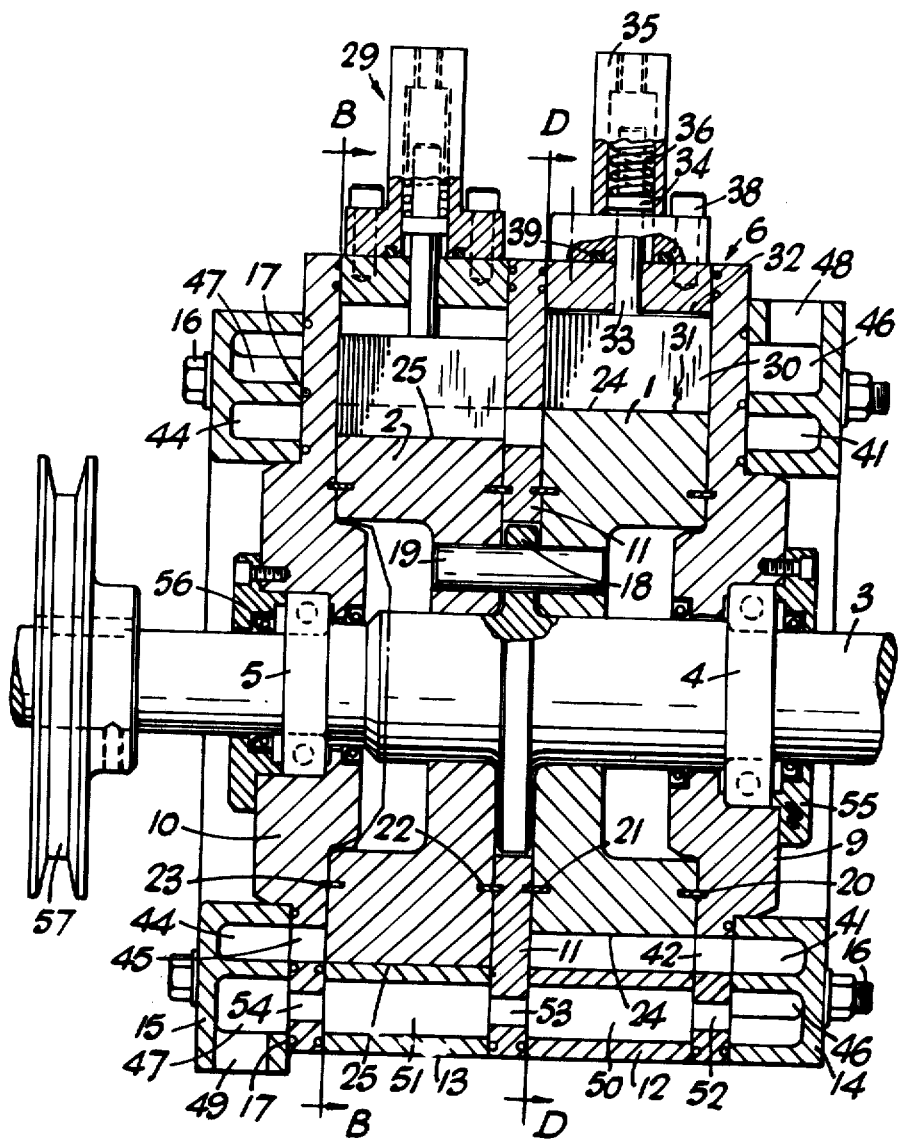
FIG. 1 is a cross sectional view of the engine taken along lines A'—A and A"—A of FIGS. 2 and 3 respectively.

Referring to the drawings, the engine construction comprises two rotors 1, 2, rigidly mounted on a main shaft 3 journalled in bearings 4, 5 mounted in a housing generally indicated at 6 such that the housing surrounds the rotors 1, 2 and forms therewith two annular chambers 7, 8 respectively (best shown in FIGS. 2 and 3) in planes at right angles to the axis of the main shaft 3. The bearings 4, 5 are provided with conventional dust covers 55, 56 secured to the housing 6.

The housing 6 comprises two end walls 9, 10 and a central wall 11 disposed substantially in planes at right angles to the axis of the main shaft 3. The central wall 11 is axially spaced from each of the end walls 9, 10 by substantially annular peripheral walls 12, 13. Arranged on the outer faces of the end walls 9, 10 respectively are an inlet manifold 14 and an exhaust manifold 15. The manifolds 14, 15, the end walls 9, 10, the central wall 11 and the peripheral walls 12, 13 are secured together by a plurality of substantially equi-spaced tie bolts 16 extending axially through the housing 6. The various portions of the housing 6 may be sealed by any convenient means, but in the embodiment described sealing is achieved by a number of O rings 17.

The rotors 1, 2 are substantially similar in shape and are arranged in fixed relation to each other and to the main shaft 3. The shaft 3 has a centrally located radially enlarged portion forming a projection 18 which, when assembled, is arranged adjacent to and inwardly of the central wall 11. The rotors 1, 2 are keyed to the projection 18 by a pin 19 such that the rotors 1, 2 are disposed on either side of the central wall 11 of the housing 6. Sliding seals 20, 21 are provided between the inlet rotor, and each of the end wall 9 and the central wall 11, thereby sealing the annular chamber 7 (best shown in FIG. 2) formed between the outer peripheral surface 24 of the inlet rotor 1 and the inner faces of each of the walls 9, 11 and 12. Similarly, sliding seals 22, 23 are provided between the exhaust rotor 2 and each of the central wall 11 and the end wall 10, thereby sealing the annular chamber 8 (best shown in FIG. 3) formed between the outer peripheral surface 25 of the exhaust rotor 2 and the inner faces of each of the walls 10, 11 and 13.

Figure 2:
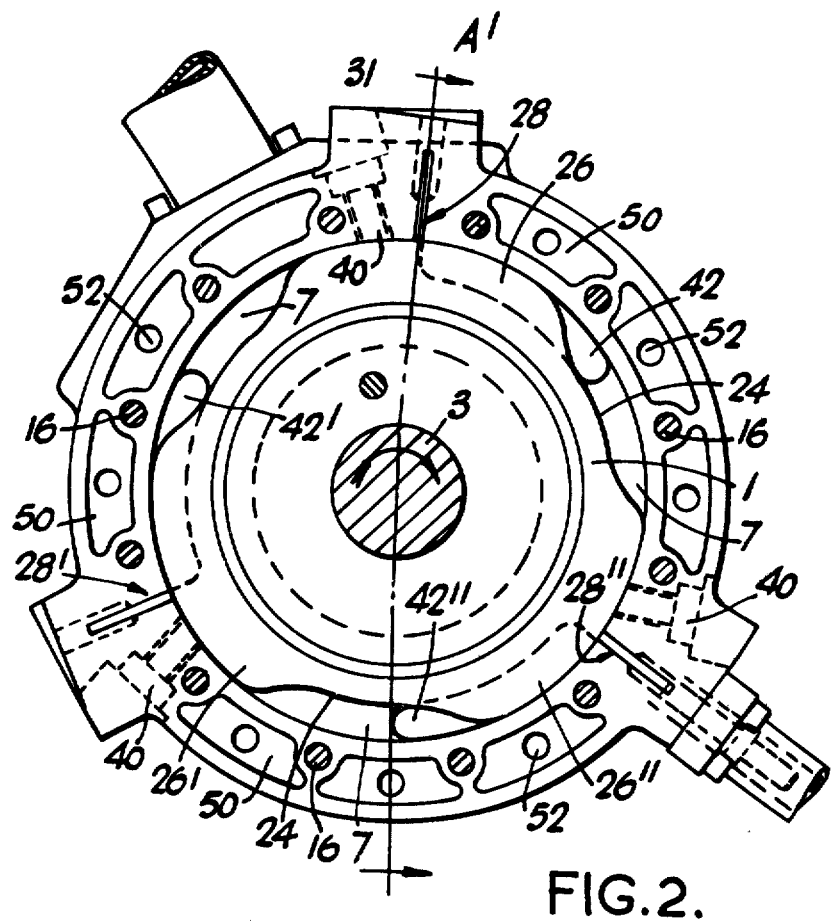
FIG. 2 is a cross sectional view of the engine taken along line D—D of FIG. 1.

Referring to FIG. 2, the inlet rotor 1 is shown having three equi-spaced lobes 26, 26', 26'' arranged around its circumference. The lobes 26, 26', 26'' are similar in shape and occupy approximately 1/6 of the circumference of the inlet rotor 1. At the location of each lobe, the lobe occupies substantially the entire cross section of the annular chamber 7. The outer peripheral surface 24 of the inlet rotor 1 has a substantially smooth circumferential contour. In a similar manner best shown in FIG. 3, the exhaust rotor 2 has three equi-spaced lobes 27, 27', 27'' substantially occupying the entire cross section of the annular chamber 8. Again, the outer peripheral surface 25 of the rotor 2 has a substantially smooth circumferential contour. The rotors 1, 2 are keyed together with the respective lobes 26, 26', 26'' and 27, 27', 27'' offset such that when viewed in an axial direction, the maximum diameter of the lobes on 1 and 2 rotors do just overlap at the point 60° from where the transfer port is opened, to ensure the transfer port does not open at this point. That is, the trailing face of the inlet lobe and the leading face of the exhaust lobe do just overlap. The degree of non-overlap of the other ends of the respective lobes is adjusted to control the compression ratio.

Returning to the housing 6, each of the peripheral walls 12, 13 have mounted therein, blocking inlet vanes 28, 28', 28'' and exhaust vanes 29, 29', 29''. The blocking vanes mounted in each peripheral wall are identical in construction and only the inlet vanes 28 will be described in detail hereinafter. The inlet vane 28 comprises a rectangular plate 30 slidably arranged in a substantially radially extending slot 31 formed in the peripheral wall 12. The plate 30 extends into the annular chamber 7 such that the radially inner edges 31 of the plate 30 slidably engages with the outer peripheral surface 24 of the rotor 1. In this manner, the plate 30 substantially blocks the entire cross section of the annular chamber 7. A push rod 33 pushes on the upper edge 32 of the plate 30, the push rod having a flange 34 on which spring pressure is exerted arranged in a cylinder 35 mounted externally of the peripheral wall 12. The push rod 34 is urged in a radially inward direction by the said spring 36 enabling contact to be maintained between the inner plate edge 31 and the peripheral surface 24 of the rotor 1. The tension of the spring 36 may be conveniently adjusted by the provision of a screw 37 shown in FIG. 3. Each cylinder 35 may be secured to the peripheral wall 12 by studs 38 and conventional sealing menas 39.

The vanes 28, 28', 28'' and 29, 29', 29'' are not all shown in detail in the drawings. However, it will be appreciated that in the embodiment described each vane is constructed as hereinabove described.

It will further be appreciated that this invention is not limited to the particular type of vane described and that various types of vanes may be utilized in differing situations. For example, in large engines, it may be desirable to design a vane specifically suited to withstand greater forces, and in other situations it may be desirable to reduce frictional forces whereby vanes in the form of rollers may be advantageous.

The vanes 28, 28', 28'' and 29, 29', 29'' are respectively equally spaced around the circumference of the peripheral walls 12, 13.

Figure 3:
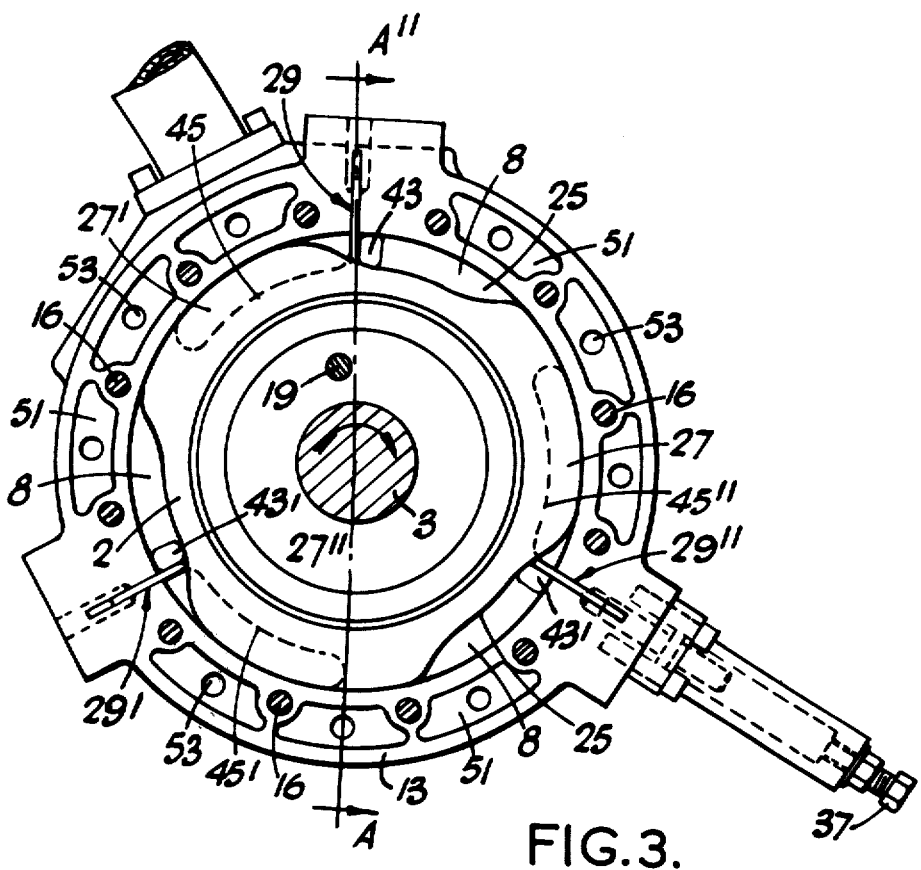
FIG. 3 is a cross sectional view of the engine taken along line B—B of FIG. 1.

Viewed in an axial direction, the inlet vanes 28, 28', 28'' are arranged rearwardly of the exhaust vanes 29, 29', 29'' with respect to the direction of rotation of the main shaft 3, shown by the arrow in FIGS. 2 and 3. Associated with each of the inlet vanes 28, 28', 28'' is a spark plug, or other ignition means (not shown) located at 40 adjacent to but forward of, each inlet vane, with respect to the direction of rotation of the main shaft 3.

The inlet manifold 14 includes a substantially U shaped annular channel 41 with its open end facing the end wall 9 of the housing 6. A conventional connection between this channel 41 and a fuel/air supply (not shown) is provided for supplying a combustible charge to the engine. Arranged in the end wall 9 at circumferentially equally spaced locations are three inlet ports 42, 42', 42'' connecting the channel 41 with the annular inlet chamber 7. The number of inlet ports equal the number of lobes on the inlet rotor and the number of inlet vanes located in the peripheral wall 12 and are located adjacent to but rearwardly of each inlet vane, with respect to the direction of rotation of the main shaft 3. Arranged in the central wall 11 are three transfer ports 43, 43', 43'' (again equalling the number of lobes on either of the rotors 1,2). Each of these transfer ports 43, 43', 43'' are arranged circumferentially between an inlet vane 28, 28', 28'', and its associated exhaust vane 29, 29', 29'' respectively.

The exhaust manifold 15 includes a substantially U shaped annular channel 44 with its open end facing the end wall 10 of the housing 6. A connection (not shown) between this channel 44 and conventional exhaust means is provided. Arranged in the end wall 10 at circumferentially equally spaced locations are three exhaust ports 45, 45', 45'' connecting the channel 44 to the annular exhaust chamber 8. The number of exhaust ports equal the number of lobes on the exhaust rotor 2 and are located adjacent to but forwardly of each exhaust vane 29, 29', 29" with respect to the direction of rotation of the main shaft 3.

FIG. 3 shows the circumferential position of each of the exhaust ports 45, 45', 45" in broken lines superimposed on the particular section illustrated.

The inlet ports 42, 42', 42" the transfer ports 43, 43', 43" and the exhaust ports 45, 45', 45" are radially located to establish and close communication between the annular chambers 7, 8 and the inlet and exhaust manifolds 14, 15 depending upon the position of the lobes on the respective rotors 1, 2.

In the inlet and exhaust manifolds 14, 15 there are also arranged annular channels 46, 47 respectively, enabling cooling fluid to be circulated through the housing 6. The channels 46, 47 are respectively arranged radially outwardly of the channels 41, 44 and have an inlet 48, and an outlet 49 enabling connection to any conventional cooling system. Spaced circumferentially around the two peripheral walls 12, 13 are a plurality of chambers 50, 51 respectively. A plurality of bores 52, 53 and 54, in the end wall 9, the central wall 11 and the end wall 10 respectively, allow the cooling fluid to be circulated through the inlet manifold 14, the peripheral walls 12, 13 and the exhaust manifold 15.

It will be appreciated that the foregoing description illustrates a preferred arrangement of an engine embodying the inventive concept. A practical engine will of course require further auxiliary equipment which in itself is well known and for the sake of clarity will not be described in detail. Such equipment could include various forms of fuel supply, exhaust equipment, cooling systems, ignition devices, starting devices, and power take off means. One form of power take off is shown in FIG. 1 comprising a pulley 57 secured by conventional means to the main shaft 3, however, various other forms may be equally utilized with an engine embodying the invention.

The operation of the above described arrangement will now be described with reference to one engine cycle. It will be appreciated that the cycle may be repeated as many times as there are lobes on each of the rotors during one revolution of the main shaft. In the following description, "forward", "reverse", "trailing", "leading" and other similar terms have reference to the direction of rotation of main shaft 3.

As the trailing face of a first lobe 26 passes a first inlet vane 28 and subsequently an associated first inlet port 42, a charge of combustible fuel is drawn into the annular chamber 7, that is, into the space between the trailing face of the lobe 26 and the rear face of vane 28. The introduction of the combustible fuel continues until the leading face of the lobe 26' lifts the vane 28 into its slot, and subsequently closes the first inlet port 42.

As the main shaft 3 rotates, the charge of combustible fuel is carried towards the next inlet vane 28" and is compressed against the reverse face of second inlet vane 28". While the combustible fuel is compressed, the transfer port 43" associated with second inlet vane 28" remains closed by the passage of first lobe 27' on the exhaust rotor 2 until such stage as compression is almost completed. At this stage the passage of first lobe 27' on exhaust rotor 2 opens the transfer port 43", the fuel is ignited and swept through the said transfer port into the annular expansion chamber 8 associated with the exhaust rotor 2. Upon further rotation of the main shaft 3 the trailing face of the lobe 26' will pass the second inlet vane 28" and another charge will be drawn into the chamber 7 enabling the process to be repeated.

The position of the exhaust rotor 2 relative to that of the inlet rotor 1 is such that the expanding combustion gases swept into the expansion chamber 8 through the transfer port 43" are confined between the trailing face of an exhaust lobe 27" and the rearward face of the exhaust vane 29" associated with the inlet vane 28". The transfer port 43" is then closed by the inlet lobe 26' and the expanding combustion gases exert driving pressure on the trailing face of the exhaust lobe 27'. Upon further rotation of the exhaust rotor 2, the exhaust port 45' associated with the next succeeding exhaust vane 29', will be opened by the passage of the trailing face of exhaust lobe 27".

It will be apparent from the foregoing description that the engine cycle contains the common characteristics of suction, compression, ignition, expansion and exhaust processes usual for internal combustion engines. Furthermore for each revolution of the main shaft the cyclic processes will be repeated for the number of lobes arranged on any one of the rotors. The compression ratio may conveniently be varied to suit design requirements by simply varying the relative positions of lobes on rotors 1 and 2 to each other. In a similar manner it is possible to obtain the most efficient expansion of the combustion gases for particular applications and fuels by varying the length of the lobes and chambers to their other capacity dimensions.

Engines embodying the invention of course include constructions having any number of lobes, within practical constraints, and ideally the power increases at a rate proportional to the square of the number of lobes per rotor provided the remaining individual capacity dimensions remain constant. Increased power and torque will of course, also be obtained by increasing the physical size or diameter of the rotors. As the engine construction is relatively short in axial dimensions it is also possible to couple two or more such engines to provide increased power output.

It will further be apparent that in multi-lobed engines, the ignition means will all fire simultaneously and as they are equally spaced around the periphery of the engine, there is little or no power load transmitted to the bearings of the main shaft. The engine itself comprises very few moving parts and is therefore simple in operation and construction. Accordingly the engine is characterized by ease and low cost production and low maintenance requirements. The power thrust of the engine is direct to the main shaft and there are no interposed mechanical transfer devices such as crank shafts, connecting rods and associated bearings which absorb or cause loss of power. Consequently the engine has a high power/weight ratio which enables greater design flexibility, for specific usage and availability of space.

Smaller frictional power losses, smaller friction heat losses and a more direct application of power combine to assist in more efficient utilization of energy from a given quantity of fuel. Moreover, efficient utilization of fuel results in a cleaner exhaust with less pollutants being discharged into the atmosphere.

I claim:

1. A two stage rotary internal combustion engine comprising a rotor mounted for rotation on a shaft within a housing, said rotor consisting of first and second relatively fixed coaxial rotor portions, each portion having at least one radially outwardly extending lobe in peripheral sealing contact with said housing, first and second annular chambers formed by said housing and said first and second rotor portions respectively, at least one fuel inlet port within said housing communicating with said first chamber, at least one transversely extending first sealing vane resiliently mounted within said first rotor portion located adjacent to, and preceding, said inlet port, at least one ignition means associated with said first chamber for the ignition of the compressed fuel therein, located within said housing adjacent to, and preceding, said first sealing vane, at least one transfer port within said housing communicating between said first and second chambers for the transfer of combustion products from said first chamber to said second chamber located adjacent to, and preceding, said first sealing vane, at least one transversely extending second sealing vane resiliently mounted within said housing in peripheral sealing contact with said second rotor portion located adjacent to, and preceding said transfer port, at least one exhaust port within said housing communicating with said second chamber for the discharge of said combustion products from said second chamber located adjacent to, and preceding, said second sealing vane, the number of inlet, transfer and outlet ports, first and second sealing vanes and ignition means each being equal to the number of lobes on each rotor portion, the lobes of the first and second rotor portions being so shaped as to act as cams relative to their associated sealing vanes and being so disposed relative to each other that when the first rotor portion has reached the end of the compression cycle and the fuel charge has been ignited in the first chamber, the transfer port is opened by both first and second rotor portions and the second rotor portion is commencing its intake cycle to receive the expanding combustion products from said transfer port.

2. The two stage rotary internal combustion engine of claim 1 wherein there are three radially outwardly extending lobes in peripheral sealing contact with said housing for each of said coaxial rotor portions.

* * * * *

UNITED STATES PATENT OFFICE
CERTIFICATE OF CORRECTION

Patent No. 3,921,595      Dated November 25, 1975

Inventor(s) LESLIE SARGEANT SAUNDERS

It is certified that error appears in the above-identified patent and that said Letters Patent are hereby corrected as shown below:

Item 73, delete "Bentburg", insert -- Bentleigh --

Item 73, delete "Oakburg", insert -- Oakleigh --

Signed and Sealed this second Day of March 1976

[SEAL]

Attest:

RUTH C. MASON
*Attesting Officer*

C. MARSHALL DANN
*Commissioner of Patents and Trademarks*